(12) United States Patent
Kim et al.

(10) Patent No.: US 11,947,521 B1
(45) Date of Patent: Apr. 2, 2024

(54) EFFICIENT AUTOMATIC WEB SCRAPING SYSTEMS AND METHODS

(71) Applicant: INTUIT INC., Mountain View, CA (US)

(72) Inventors: Aleksandr Kim, Tel Aviv (IL); Itay Margolin, Tel Aviv (IL); Yair Horesh, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/062,544

(22) Filed: Dec. 6, 2022

(51) Int. Cl.
*G06F 16/23* (2019.01)

(52) U.S. Cl.
CPC ...... *G06F 16/2365* (2019.01); *G06F 16/2358* (2019.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 10,861,092 B1* | 12/2020 | Misra | | G06N 7/01 |
| 2015/0254783 A1* | 9/2015 | Levin | | G06Q 50/186 |
| | | | | 705/30 |
| 2019/0108465 A1* | 4/2019 | Zhou | | G06Q 10/06375 |
| 2020/0327243 A1* | 10/2020 | Song | | G06N 20/00 |
| 2021/0136538 A1* | 5/2021 | Shah | | G06Q 30/0201 |

OTHER PUBLICATIONS

Boots, Byron, "Section 6: Naive Bayes", University of Washington, CSE: 446: Machine Learning lecture notes, Jan. 27, 2020, 2 pages. (Year: 2020).*
Bluman, Allan, "Elementary Statistics: A Step by Step Approach", 2014, 9th ed., McGraw-Hill Education, Chapter 4 "Probability and Counting Rules", 73 pages. (Year: 2014).*
Ghule, Kedar, "MySQL Last_Day()—Find the last day of a month in MySQL", mysqlcode.com blog post published Mar. 20, 2021, 7 pages. (Year: 2021).*

* cited by examiner

Primary Examiner — Scott A. Waldron
(74) Attorney, Agent, or Firm — DLA Piper LLP (US)

(57) ABSTRACT

A processor may identify a plurality of data sets subject to upcoming update processing in a next update cycle. For each of the plurality of data sets, the processor may determine a probability that data included in the data set has changed since a most recent update processing. The processor may exclude a first subset of the plurality of data sets having respective probabilities below a threshold value from the upcoming update processing until the respective probabilities are determined again in a subsequent update cycle. The processor may perform the upcoming update processing on the plurality of the data sets not included in the first subset, where the upcoming update processing may include obtaining updated data from at least one external data source.

12 Claims, 5 Drawing Sheets

EFFICIENT AUTOMATIC WEB SCRAPING SYSTEMS AND METHODS

BACKGROUND

Many computing systems depend on data accuracy. In contexts where data changes over time, it is important that the data is as up to date as possible. This creates challenges when computing systems rely on external data sources. Broadly speaking, the techniques used to get external data are referred to as "scraping," and they involve reaching out to external data sources to locate and gather new data on a periodic or on-demand basis. These computing systems have to refresh the data frequently, so they have to frequently scrape data from external data sources, which can be time, bandwidth, and/or resource intensive. In some cases, automatic data scraping efficiencies can be realized through straightforward assumptions. For example, if a particular data source is known to update on the same day each month, it is simple to schedule scraping that data shortly after the known update time. On the other hand, many kinds of data are known to update from time to time, but without being tied to a well-defined schedule, making it risky to simply schedule fewer scraping events for such data.

BRIEF DESCRIPTIONS OF THE DRAWINGS

DETAILED DESCRIPTION OF SEVERAL EMBODIMENTS

Systems and methods described herein improve automatic data scraping technologies. For example, disclosed embodiments increase the operational and bandwidth efficiencies of data scraping technologies so that they can gather fresh, up to date data with fewer scraping operations. For example, the disclosed systems and methods optimize scraping operations to target only data that has a high likelihood of having changed since the last time it was retrieved.

For example, scraping efficiency can be improved for systems where a data source being scraped is known to update over time, but where the specific intervals at which the data is updated are volatile. By way of illustration, a bank account is used herein as an example of such a data source, but those of ordinary skill in the art will appreciate that this is one example of many possible data sources that could be scraped more efficiently using the disclosed techniques.

As an overview, embodiments described herein can improve scraping efficiency by analyzing historical data to discover trends or tendencies, predict likelihood of data changing for a given day or other time period, determining whether it is worthwhile to scrape based on such prediction, and modifying, implementing, or postponing scraping operations. Specific technical details and examples are presented below with respect to the embodiments shown in the figures.

Figure 1:
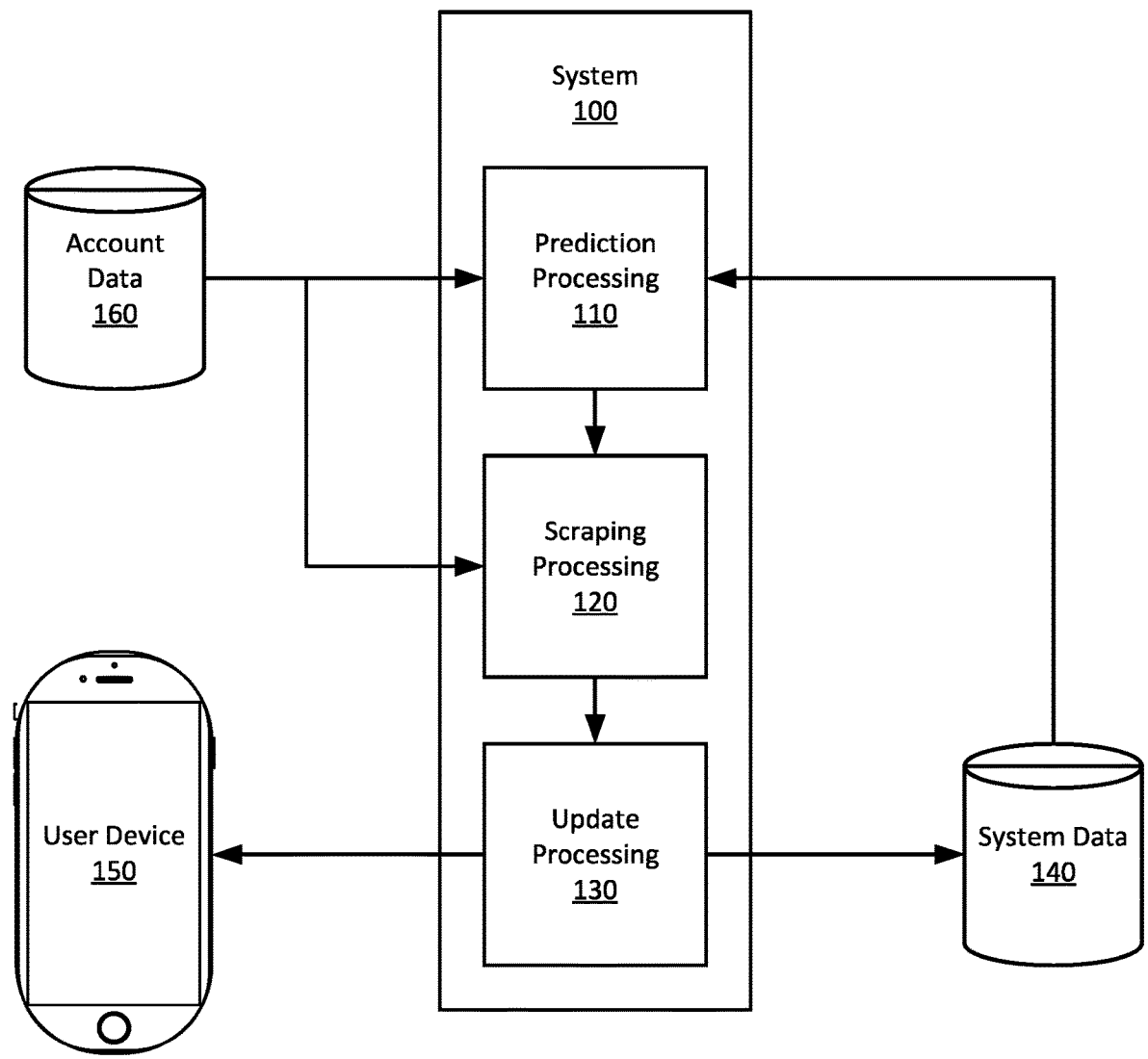
FIG. 1 shows an example web scraping system according to some embodiments of the disclosure.

FIG. 1 shows an example web scraping system 100 according to some embodiments of the disclosure. System 100 may include a variety of hardware, firmware, and/or software components that interact with one another. Some components may communicate with client(s), such as user device 150, and/or data sources, such as account data source 160, through one or more networks (e.g., the Internet, an intranet, and/or one or more networks that provide a cloud environment).

Some components may communicate with one another using networks. Each component may be implemented by one or more computers (e.g., as described below with respect to FIG. 5).

Figure 3:
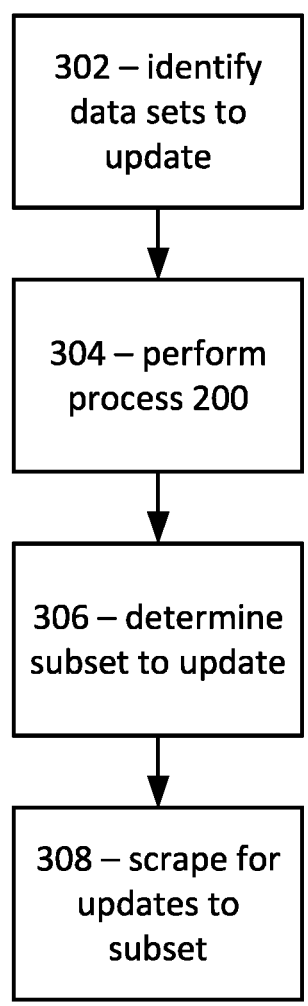
FIG. 3 shows an example batch scraping process according to some embodiments of the disclosure.
Figure 4:
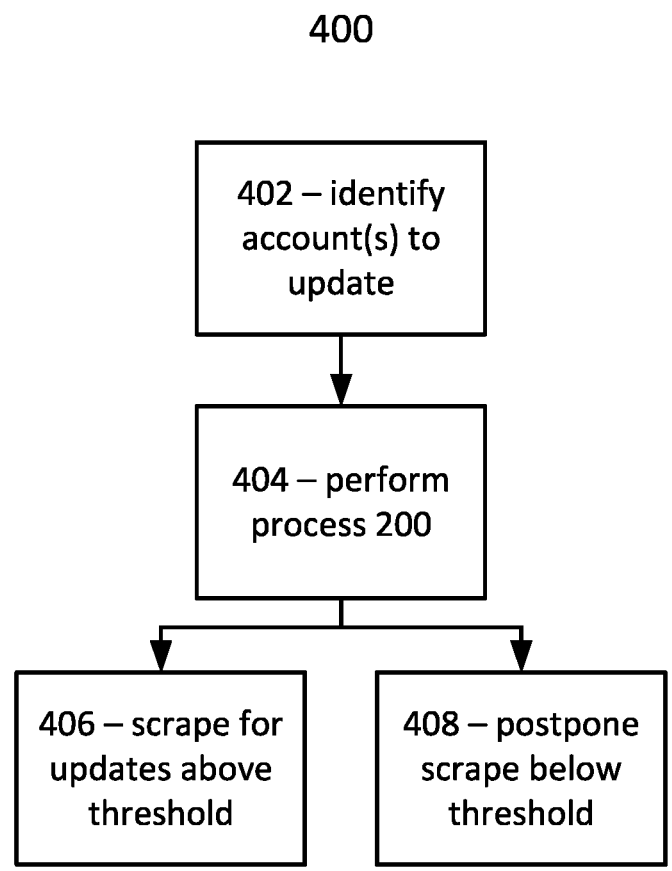
FIG. 4 shows an example single scraping process according to some embodiments of the disclosure.

As described in detail below, system 100 can perform processing to scrape external data to update internal data (e.g., data stored in system data store 104 and/or data used by user device 150). Moreover, system 100 implements processing to make data scraping more efficient without missing data updates. In service of this goal, prediction processing 110 can analyze past data to predict when future updates may occur. Scraping processing 120 can scrape external data for updates according to the schedule(s) proposed by prediction processing 110. Update processing 130 can update local data and/or user device 150 with the results of scraping operation(s). For example, FIGS. 2-4 illustrate the functioning of the illustrated components in detail.

Elements illustrated in FIG. 1 (e.g., system 100 including prediction processing 110, scraping processing 120, and/or update processing 130; system data store 140; user device 150; and/or account data source 160) are each depicted as single blocks for ease of illustration, but those of ordinary skill in the art will appreciate that these may be embodied in different forms for different implementations. For example, while prediction processing 110, scraping processing 120, and update processing 130 are depicted separately, any combination of these elements may be part of a combined hardware, firmware, and/or software element. Likewise, while prediction processing 110, scraping processing 120, and update processing 130 are depicted as parts of a single system 100, any combination of these elements may be distributed among multiple logical and/or physical locations. Also, while one system data store 140, one user device 150, one account data source 160, and one system 100 are illustrated, this is for clarity only, and multiples of any of the above elements may be present. In practice, there may be single instances or multiples of any of the illustrated elements, and/or these elements may be combined or co-located.

In the following descriptions of how system 100 functions, several examples are presented. These examples are in the context of scraping transaction data related to user accounts, such as financial accounts. However, those of ordinary skill in the art will appreciate that these examples are merely for illustration, and system 100 and its methods of use and operation are extendable to other application and data contexts.

Figure 2:
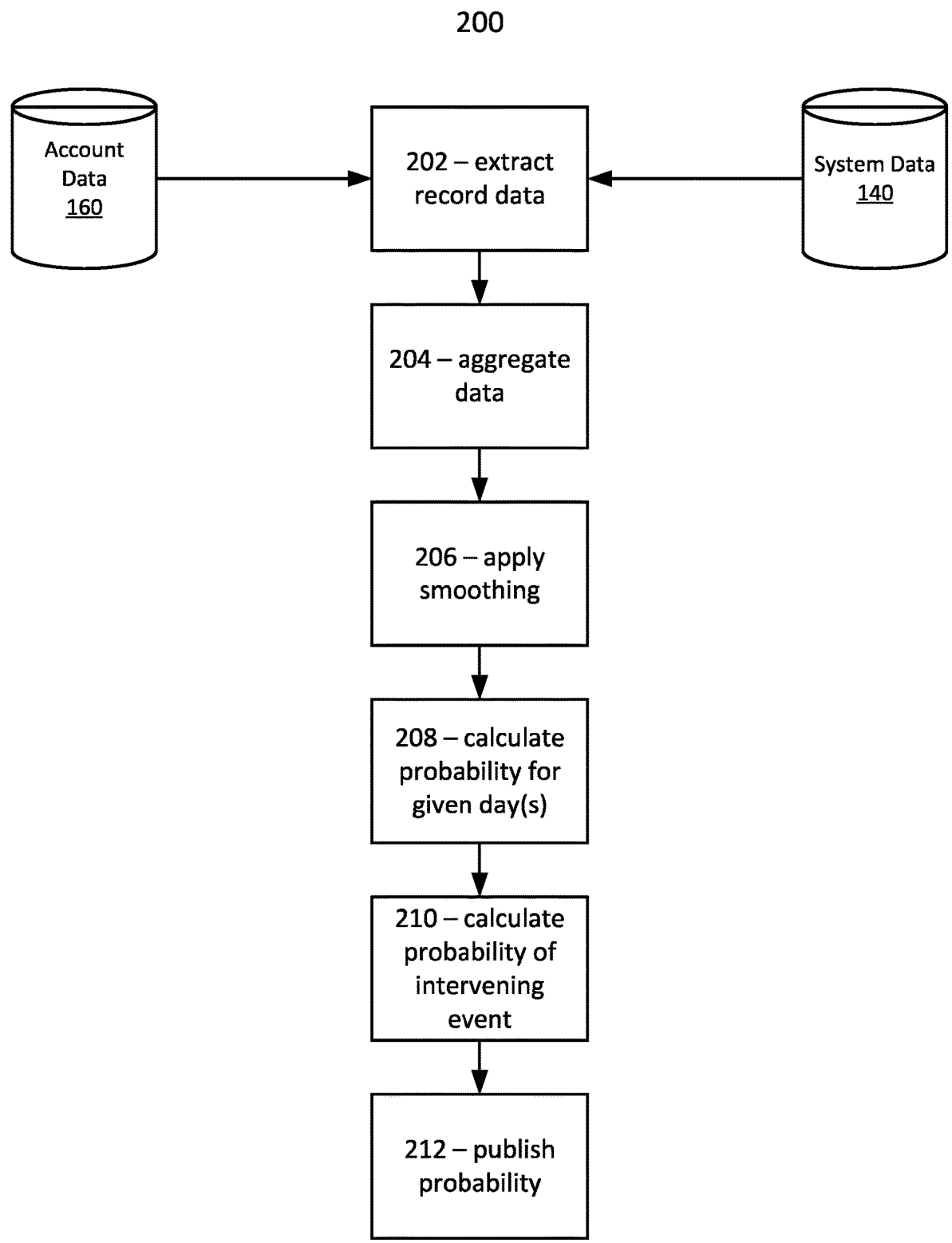
FIG. 2 shows an example probability determination process according to some embodiments of the disclosure.

FIG. 2 shows an example probability determination process 200 according to some embodiments of the disclosure. System 100 (e.g., prediction processing 110 of system 100) can perform process 200 to determine the probability that particular data of interest has updated during a particular time of interest. As an illustrative example, system 100 can apply process 200 to account data for a user account to determine a likelihood that there has been activity on that user account within a particular time span, such as a transaction made using the account. In particular, the following discussion of process 200 analyzes transactions made on a single user account for illustration purposes. However, it will be appreciated that process 200 can apply to other kinds of updates in other kinds of data sets.

At 202, prediction processing 110 can extract record data, which can include historical data of user transactions in this example. In some embodiments, prediction processing 110 can obtain data for multiple months (e.g., 24 months). In the transaction example, the data can include at least the date of transactions and the number of transactions. Prediction processing 110 can obtain the data from internal sources (e.g., system data 140) and/or external sources (e.g., account data 160).

At 204, prediction processing 110 can aggregate data obtained at 202. For example, prediction processing 110 can aggregate counts (e.g., counts of transactions) for each day of the week and for each day of the month. Accordingly, for each day of the week, prediction processing 110 can assert how many times there were new transactions on that day and how many total examples of that day were counted. For example, prediction processing 110 can return for Monday a record that 20 total transactions were recorded, and 96 total Mondays were examined.

Likewise, for each day of the month, prediction processing 110 can assert how many times there were new transactions on that day and how many total examples of that day were counted. For example, prediction processing 110 can return for the first day of the month that 50 total transactions were recorded, and 24 total first days of the month were examined. In the case of days of the month, prediction processing 110 can designate days as "last day of the month." Since the last day of the month is dependent on the month and year (e.g., the date could be 28, 29, 30, or 31), prediction processing 110 can add a special date "last day of the month," which can ensure that the total count for the days of the month that were examined is accurate. Thus, instead of designating March 31 as simply the 31st day of the month, or April 30 as simply the 30th day of the month, for example, each of these two days can be designated as March—last day or April—last day, respectively.

At 206, prediction processing 110 can apply smoothing processing, which, for example, can help determine how many times there was a transaction on a certain day of the month and/or of the week. In some embodiments, prediction processing 110 can apply Laplace smoothing, although other known or novel smoothing methods may be used instead.

At 208, based on the smoothing processing at 206, prediction processing 110 can calculate a probability of a transaction occurring on a certain day of the month and/or of the week. For example, prediction processing 110 can use the following formula to calculate the probability that a new transaction is waiting at certain day of week/month:

$$p\_specific\_date = \max(p\_weekly(day\_of\_week|history), p\_monthly(day\_of\_month|history)).$$

Prediction processing 110 can calculate the probability for each date since the last time data was scraped for the account in question. For example, if it has been ten days since the last update, prediction processing 110 can calculate p_specific_date for each of the ten dates since the update.

At 210, prediction processing 110 can use the probabilities from 208 to calculate the probability of an event having taken place, such as a transaction on the account, since the last update. That is, at 208, prediction processing 110 calculated the p_specific_date for all days from the last time an account was scraped to the current date. Thus, prediction processing 110 can use the following formula to determine the probability there is a new transaction:

$$p\_new\_transaction = 1 - Pi(\min(MAX\_PROB, (1 - p\_specific\_date)))$$

for every date in between the two dates, where Pi—'multiplication of' MAX_PROB is a cap on the complementary probability (its value can be 0.95 for example). Its role is to ensure that even accounts that are very unlikely to have new transactions will be scraped within a few days, as a fail safe to catch unlikely transactions before too much time passes.

At 212, prediction processing 110 can publish the p_new_transaction probability for the account being analyzed. As described below, system 100 can use the published probability to determine whether to scrape for new data. As an example, in some embodiments of system 100, accounts with probabilities below a predefined threshold (e.g., 10%) will be exempted from being scraped.

Accordingly, by performing process 200, system 100 can use times of previous updates during an historical time span (e.g., greater than one month) to calculate a probability of a new update occurring at a certain future time. This probability may be a probability of an update having taken place at a time between the most recent update and a current time.

FIG. 3 shows an example batch scraping process 300 according to some embodiments of the disclosure. System 100 can perform process 300 to scrape one or more data sources for updates related to a plurality of data sets. To make such scraping more efficient, process 300 incorporates the probability determination of process 200, as described below, thereby enabling system 100 to avoid scraping data for accounts unlikely to have updates.

At 302, prediction processing 110 can identify a plurality of data sets subject to upcoming update processing in a next update cycle. For example, prediction processing 110 can select all user accounts, or a subset thereof, for update processing, where update processing includes scraping external data sources for updates.

At 304, prediction processing 110 can perform process 200, described above, to determine probabilities for each data set identified at 302. Thus, for each data set of the plurality of data sets, prediction processing 110 can determine a probability that data included in the data set has changed since a most recent update processing.

At 306, scraping processing 120 can determine a subset of the data sets to update based on the probabilities from 304. As such, scraping processing 120 can exclude a first subset of the plurality of data sets having respective probabilities below a threshold value from the upcoming update processing until the respective probabilities are determined again in a subsequent update cycle (e.g., and they are higher than the threshold). The plurality of data sets not included in the first subset form a second subset which is the subset to update. These data sets have respective probabilities at or above the threshold value.

At 308, scraping processing 120 can perform the upcoming update processing on the plurality of the data sets not included in the first subset. The upcoming update processing can include obtaining updated data from at least one external data source, for example by scraping one or more web data sources and/or otherwise downloading the updated data from the at least one external data source through a network connection. Update processing 130 can use the results of the scraping operation to update system data 140 and/or for use in further processing, such as by user device 150.

It will be appreciated that in subsequent processing cycles (e.g., repetitions of process 300), probabilities for given data sets may change such that an account that was below the threshold before may now be above the threshold. Accordingly, if process 300 is repeated, scraping processing 120 can exclude a different subset than the first subset that is not identical to the first subset in many cases.

FIG. 4 shows an example single scraping process 400 according to some embodiments of the disclosure. System 100 can perform process 400 to determine whether scraping is timely and scrape one or more data sources for updates if so. To make such scraping more efficient, process 400 incorporates the probability determination of process 200, as described below, thereby enabling system 100 to schedule scraping operations only for times when updates are likely to have occurred.

At 402, prediction processing 110 can identify one or more data sets subject to upcoming update processing in a next update cycle. The data set can include at least one event record, with each event record having associated therewith a date of a respective event.

At 404, prediction processing 110 can perform process 200, described above, to determine probabilities for the data set identified at 402. Thus, prediction processing 110 can determine at least one probability that at least one subsequent event has occurred on at least one subsequent date later than the at least one event record and prior to or including a current date. From the at least one probability, prediction processing 110 can calculate an overall probability of an event. Depending on the probability calculated at 404, scraping processing 120 can perform processing either at 406 or 408.

At 406, scraping processing 120 can obtain updated data from at least one external data source, for example by scraping one or more web data sources and/or otherwise downloading the updated data from the at least one external data source through a network connection. Scraping processing 120 can perform the scraping in response to the overall probability being above a threshold value (e.g., above 0.1 or some other predetermined value). Update processing 130 can use the results of the scraping operation to update system data 140 and/or for use in further processing, such as by user device 150.

At 408, scraping processing 120 can postpone scraping for the data set in response to the overall probability being below the threshold value. In this way, scraping processing 120 can avoid duplicative scraping operations and avoid further processing by update processing 130 until the data to be scraped is more likely to include updates, thereby improving overall efficiency of the scraping processing.

It will be appreciated that in subsequent processing cycles (e.g., repetitions of process 400), probabilities for given data sets may change such that an account that was below the threshold before may now be above the threshold. Accordingly, if process 400 is repeated, scraping processing 120 can perform scraping at 406 in many cases after a previous cycle of process 400 resulted in postponing at 408.

Figure 5:
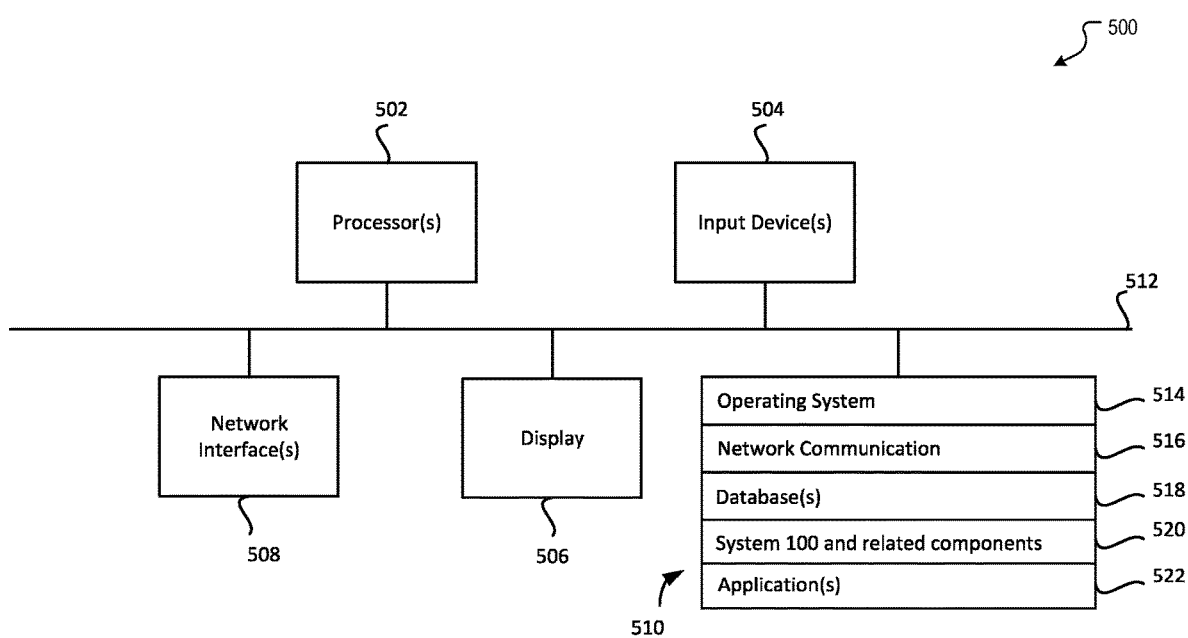
FIG. 5 shows a computing device according to some embodiments of the disclosure.

FIG. 5 shows a computing device 500 according to some embodiments of the disclosure. For example, computing device 500 may function as system 100 or any portion(s) thereof, or multiple computing devices 500 may function as system 100.

Computing device 500 may be implemented on any electronic device that runs software applications derived from compiled instructions, including without limitation personal computers, servers, smart phones, media players, electronic tablets, game consoles, email devices, etc. In some implementations, computing device 500 may include one or more processors 502, one or more input devices 504, one or more display devices 506, one or more network interfaces 508, and one or more computer-readable mediums 510. Each of these components may be coupled by bus 512, and in some embodiments, these components may be distributed among multiple physical locations and coupled by a network.

Display device 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device 504 may be any known input device technology, including but not limited to a keyboard (including a virtual keyboard), mouse, track ball, and touch-sensitive pad or display. Bus 512 may be any known internal or external bus technology, including but not limited to ISA, EISA, PCI, PCI Express, NuBus, USB, Serial ATA or FireWire. In some embodiments, some or all devices shown as coupled by bus 512 may not be coupled to one another by a physical bus, but by a network connection, for example. Computer-readable medium 510 may be any medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 510 may include various instructions 514 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 may establish and maintain network connections (e.g., software for implementing communication protocols, such as TCP/IP, HTTP, Ethernet, telephony, etc.).

Database(s) 518 may include data used by system 100 to determine probabilities as described above, such as past transaction records, for example. Components 520 may include the system elements and/or the instructions that enable computing device 500 to perform the processing of system 100 as described above. Application(s) 522 may be an application that uses or implements the outcome of processes described herein and/or other processes. For example, application(s) 522 may provide UI and/or UI elements for displaying and/or manipulating updates identified by system 100 as described above. In some embodiments, the various processes may also be implemented in operating system 514.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   identifying, by a processor, a plurality of data sets subject to upcoming update processing in a next update cycle, the next update cycle comprising a plurality of calendar dates;
   performing, by the processor, prediction processing for each data set of the plurality of data sets, the prediction processing comprising:
      identifying a calendar date on which a most recent update processing for the data set occurred,
      determining that at least one day since the most recent update processing for the data set occurred is designated a last day of a month,
      calculating, for the at least one day, a first daily probability that data included in the data set changed on the at least one day based on the at least one day being designated the last day of the month,
      calculating, for at least each respective day since the most recent update processing other than the at least one day, a second daily probability that data included in the data set changed on the respective day based on the calendar date of the respective day,
      calculating an overall probability that data included in the data set has changed since the most recent update processing based on each first daily probability and second daily probability, and assigning the data set to a first subset of the plurality of data sets in response to the overall probability of the data set being below a threshold value;

excluding, by the processor, the first subset of the plurality of data sets from update processing in the next update cycle until the respective overall probabilities are calculated again in a subsequent update cycle; and performing, by the processor, the upcoming update processing on the plurality of the data sets not included in the first subset, the upcoming update processing including scraping updated data from at least one external data source.

2. The method of claim 1, wherein, for each data set of the plurality of data sets, the determining comprises:
   finding times when previous update processing occurred during an historical time span; and
   calculating a third daily probability of a new update occurring at a certain future time based on the finding;
   wherein the calculating of the overall probability is based on the first daily probability, the second daily probability, and the third daily probability.

3. The method of claim 2, wherein:
   the historical time span is greater than one month; and
   the finding further comprises applying Laplace smoothing to the historical time span.

4. The method of claim 1, wherein the scraping updated data from at least one external data source comprises downloading the updated data from the at least one external data source through a network connection.

5. A system comprising:
   a processor; and
   a non-transitory memory in communication with the processor and storing instructions that, when executed by the processor, cause the processor to perform processing comprising:
      identifying a plurality of data sets subject to upcoming update processing in a next update cycle, the next update cycle comprising a plurality of calendar dates;
      performing prediction processing for each data set of the plurality of data sets, the prediction processing comprising:
         identifying a calendar date on which a most recent update processing for the data set occurred,
         determining that at least one day since the most recent update processing for the data set occurred is designated a last day of a month,
         calculating, for the at least one day, a first daily probability that data included in the data set changed on the at least one day based on the at least one day being designated the last day of the month,
         calculating, for at least each respective day since the most recent update processing other than the at least one day, a second daily probability that data included in the data set changed on the respective day based on the calendar date of the respective day,
         calculating an overall probability that data included in the data set has changed since the most recent update processing based on each first daily probability and second daily probability, and
         assigning the data set to a first subset of the plurality of data sets in response to the overall probability of the data set being below a threshold value;
      excluding the first subset of the plurality of data sets from update processing in the next update cycle until the respective overall probabilities are calculated again in a subsequent update cycle; and
      performing the upcoming update processing on the plurality of the data sets not included in the first subset, the upcoming update processing including scraping updated data from at least one external data source.

6. The system of claim 5, wherein, for each data set of the plurality of data sets, the determining comprises:
   finding times when previous update processing occurred during an historical time span; and
   calculating a third daily probability of a new update occurring at a certain future time based on the finding;
   wherein the calculating of the overall probability is based on the first daily probability, the second daily probability, and the third daily probability.

7. The system of claim 6, wherein:
   the historical time span is greater than one month; and
   the finding further comprises applying Laplace smoothing to the historical time span.

8. The system of claim 5, wherein the scraping updated data from at least one external data source comprises downloading the updated data from the at least one external data source through a network connection.

9. A non-transitory computer-readable medium storing instructions that, when executed by a processor, cause the processor to perform processing comprising:
   identifying a plurality of data sets subject to upcoming update processing in a next update cycle, the next update cycle comprising a plurality of calendar dates;
   performing prediction processing for each data set of the plurality of data sets, the prediction processing comprising:
      identifying a calendar date on which a most recent update processing for the data set occurred,
      determining that at least one day since the most recent update processing for the data set occurred is designated a last day of a month,
      calculating, for the at least one day, a first daily probability that data included in the data set changed on the at least one day based on the at least one day being designated the last day of the month,
      calculating, for at least each respective day since the most recent update processing other than the at least one day, a second daily probability that data included in the data set changed on the respective day based on the calendar date of the respective day,
      calculating an overall probability that data included in the data set has changed since the most recent update processing based on each first daily probability and second daily probability, and
      assigning the data set to a first subset of the plurality of data sets in response to the overall probability of the data set being below a threshold value;
   excluding the first subset of the plurality of data sets from update processing in the next update cycle until the respective overall probabilities are calculated again in a subsequent update cycle; and
   performing the upcoming update processing on the plurality of the data sets not included in the first subset, the upcoming update processing including scraping updated data from at least one external data source.

10. The non-transitory computer-readable medium of claim 9, wherein, for each data set of the plurality of data sets, the determining comprises:
   finding times when previous update processing occurred during an historical time span; and
   calculating a third daily probability of a new update occurring at a certain future time based on the finding;

wherein the calculating of the overall probability is based on the first daily probability, the second daily probability, and the third daily probability.

11. The non-transitory computer-readable medium of claim 10, wherein:
   the historical time span is greater than one month; and
   the finding further comprises applying Laplace smoothing to the historical time span.

12. The non-transitory computer-readable medium of claim 9, wherein the scraping updated data from at least one external data source comprises downloading the updated data from the at least one external data source through a network connection.

* * * * *